United States Patent
Winterot (10) Patent No.: US 7,724,427 B2
(45) Date of Patent: May 25, 2010

(54) STEREOSCOPIC MICROSCOPE WITH HIGH NUMERICAL APERTURE

(75) Inventor: Johannes Winterot, Jena (DE)

(73) Assignee: Carl Zeiss Microimaging GmbH, Jena (DE)

( * ) Notice: Subject to any disclaimer, the term of this patent is extended or adjusted under 35 U.S.C. 154(b) by 494 days.

(21) Appl. No.: 11/664,557

(22) PCT Filed: Sep. 28, 2005

(86) PCT No.: PCT/EP2005/010474

§ 371 (c)(1),
(2), (4) Date: Apr. 2, 2007

(87) PCT Pub. No.: WO2006/037530

PCT Pub. Date: Apr. 13, 2006

(65) Prior Publication Data

US 2009/0052020 A1 Feb. 26, 2009

(30) Foreign Application Priority Data

Oct. 1, 2004 (DE) .................... 10 2004 048 297

(51) Int. Cl.
G02B 21/20 (2006.01)
(52) U.S. Cl. .............. 359/377; 359/422; 359/462
(58) Field of Classification Search .............. None
See application file for complete search history.

(56) References Cited

U.S. PATENT DOCUMENTS 6,717,739 B2 * 4/2004 Zimmer et al. .............. 359/661

2003/0210470 A1* 11/2003 Zimmer et al. .............. 359/686
2004/0057108 A1 3/2004 Namii

FOREIGN PATENT DOCUMENTS

| DE | 102 22 041 | 12/2003 |
|---|---|---|
| EP | 1 361 467 | 11/2003 |
| EP | 1 369 729 | 12/2003 |

OTHER PUBLICATIONS

XP009013507 SPIE vol. 3482, pp. 690-697, Klaus-Peter Zimmer "Optical Designs for Stereomicroscopes", 1998.

* cited by examiner

Primary Examiner—Stephone B Allen
Assistant Examiner—Derek S Chapel
(74) Attorney, Agent, or Firm—Frommer Lawrence & Haug LLP (57) ABSTRACT

A telescope-type stereomicroscope which is outfitted with an objective and two magnification changers arranged downstream of the objective. In this telescope-type stereomicroscope, the light from an object that is being examined enters the objective. Two light bundles of the light re-exiting from the objective, which are oriented parallel to one another, enter the magnification changers. The optical axes of the magnification changers are arranged at a fixed distance from one another. Each magnification changer has an entrance pupil for the light bundle associated with it. The entrance pupil has a diameter $D_{EP}$ that depends on the respective selected magnification, where the condition $D_{EP} > B/1.06$ is met at the maximum selected magnification. Optionally, the stereomicroscope meets the condition $\tan(\omega) \geq 0.16$ with respect to the angle ω at which the light coming from an extra-axial point P at the object enters the magnification changers at the lowest possible magnification setting.

8 Claims, 5 Drawing Sheets

STEREOSCOPIC MICROSCOPE WITH HIGH NUMERICAL APERTURE

CROSS-REFERENCE TO RELATED APPLICATIONS

This application claims priority of International Application No. PCT/EP2005/010474, filed Sep. 28, 2005 and German Application No. 10 2004 048 297.7, filed Oct. 1, 2004, the complete disclosures of which are hereby incorporated by reference.

BACKGROUND OF THE INVENTION a) Field of the Invention

The invention is directed to a telescope-type stereomicroscope which is outfitted with an objective and two magnification changers which are arranged downstream of the objective for selecting different magnifications while observing an object.

b) Description of the Related Art

In this type of construction of a stereomicroscope, two separate light channels are guided through one and the same objective in order to achieve the stereoscopic impression. Provided in sequence from the object are, first, the objective and, following that, in two beam paths which are oriented parallel to one another and which serve for separate observation by the left and right eye, a magnification changer which is generally afocal, a tube lens system, an image erecting system, and an eyepiece.

The sequence of the image erecting system and tube lens system may also be reversed depending on the construction of the stereomicroscope. Further, elements can be provided for reflecting illumination light and image information into and out of the beam path.

To an increasing extent, users of stereomicroscopes of this type of construction want the advantages of three-dimensional viewing combined with large visual fields and higher resolution. This enables an overview of an object and large object fields with high imaging quality and also detailed viewing of small object portions with high magnification without needing to change the objective when moving from one viewing mode to the other.

Further, a large free working distance between the object and objective is often desired so that the object can be manipulated with as little hindrance as possible.

Because of these demands, the microscope manufacturer is increasingly obliged to resolve the contradiction between decreasing the focal length of the objective in order to achieve higher resolution and ensuring large visual fields with a large free working distance.

One expedient for these conflicting requirements is to develop objectives in which the principal plane is advantageously positioned because a principal plane that is displaced in direction of the object results in an increased working distance. An objective of this kind is described in EP 1 369 729, for example.

However, this objective is relatively complicated to manufacture and therefore increases costs.

OBJECT AND SUMMARY OF THE INVENTION

On this basis, it is the primary object of the invention to further develop stereomicroscopes of the type mentioned in the beginning in such a way that they meet the demand for the greatest possible free working distance between the object and objective as well as the demand for changing from the overview of an object to very detailed observation with high magnification of the object without changing objectives.

According to the invention, this object is met for a stereomicroscope constructed in the manner mentioned in the beginning, wherein the light coming from the object enters the objective, two light bundles of the light re-exiting from the objective which are oriented parallel to one another enter the magnification changers, the optical axes of the magnification changers are arranged at a fixed distance B from one another, each magnification changer has an entrance pupil for the light bundle associated with it, which entrance pupil has a diameter $D_{EP}$ that depends on the respective selected magnification, and wherein the condition $D_{EP} > B/1.07$ is met at the maximum selected magnification.

The condition $B/1.07 < D_{EP} \leq B/1.04$ is preferably met and the two magnification changers are constructed in such a way that their physical extension perpendicular to the optical axes in direction of the respective neighboring magnification changer is $\leq B/2$.

The condition $D_{EP} = 1.55 * B$ applies for a particularly preferred embodiment of the invention.

It can be provided, for example, that the diameter $D_{EP}$ is 23 mm and the distance B is 14.8 mm. In this case, the two entrance pupils in cross section have the shape of two adjoining circle segments.

The idea of the invention proceeds from the assumption that the resolution for the visual area is defined by approximately 3000*nA and is related to the objective and the beam path downstream thereof by the equation $nA = D_{EP}/2*f_{objective}$, where nA is the numerical aperture and $f_{objective}$ is the focal length of the objective.

Further, in order to meet the requirements for the desired magnification, namely that the eye pupil is not dazzled on the one hand and the image is not excessively impaired by local interference in the eyepieces and the eyes, the following condition is taken as a basis:

$$\Gamma_{microscope} = f_{tube}/f_{objective} * \Gamma_{magnification\ changer} * 250/f_{eyepiece},$$

where $\Gamma_{microscope}$ is the magnification of the microscope, $f_{tube}$ is the focal length of the tube, $f_{objective}$ is the focal length of the objective, $\Gamma_{magnification\ changer}$ is the maximum magnification of the magnification changers, and $f_{eyepiece}$ is the focal length of an eyepiece.

With respect to the relationship between the numerical aperture and the maximum microscope magnification:

$$500*nA \geq \Gamma_{microscope} \leq 1000*nA.$$

When considering the ratio of this lower limit to this upper limit, it is apparent that when the magnification changers have a zoom factor of $$M_{zoom} = \Gamma_{magnification\ changer\ max}/\Gamma_{magnification\ changer\ min} > 2$$

there must be a change in the numerical aperture so that the condition is met for the desired magnification. At present, the requirements for the zoom factor of a magnification changer tend increasingly to be $M_{zoom} \geq 6$.

The stereomicroscope according to the invention makes it possible to meet the demand for changing from the general overview of an object to the view of very small magnified details without changing objectives.

When considering the components located closest to the objective within the magnification changer, it is clear that the use of the optical interfaces of the intermediate image generated by the tube lens varies only slightly for these components at high magnifications. At lower magnifications, on the other hand, the point of the narrowest waist of all of the beams considered from the objective to the magnification changer is displaced in direction of the tube.

It will be assumed in the following that the objective has a collective effect and the first (considered from the objective) component in the magnification changer has the largest diameter. The optically useful diameter at this first component after the objective then depends on the respective adjusted magnification $\Gamma_{magnification\ change}$ at the magnification changer because of the diameter of the axial pencil at this location.

Therefore, it further holds true that the diameter of the principal ray $$D_{principal\ ray} = 2*\text{"maximum height of all of the principal rays"}$$

is a function of the magnification $\Gamma_{magnification\ changer}$ adjusted in each instance at the magnification changer for every component.

Taking into account on this basis that the optical axes of the optical systems arranged downstream of the objective have a distance B relative to one another, applying $B-D_{principal\ ray}$ for all components of these systems and taking the minimum thereof will give a quantity for the extent to which these components can be trimmed at their circumference and arranged closer to one another without cutting off the sides of the principal ray.

In previous known stereomicroscopes, a ratio $D_{EP} \leq B/1.07$ is achieved at the highest possible magnification setting $\Gamma_{magnification\ changer}$ insofar as the optical components contained in the magnification changers are appropriately designed with respect to assembly and mounting.

According to the invention, the condition $D_{EP} \geq B$ is achieved by trimming the circumferences of the components and arranging them closer to one another in the microscope assembly.

In a special embodiment, the stereomicroscope according to the invention meets the condition $\tan(\omega) \geq 0.16$ with respect to the angle co at which the light coming, e.g., from an extra-axial point P enters the magnification changers at the minimum magnification setting.

In a specific constructional variant, the stereomicroscope according to the invention is outfitted with magnification changers which comprise at least four optical assemblies, two of which are displaceable relative to one another and relative to the rest of the assemblies when changing magnification.

The invention will be described more fully in the following with reference to an embodiment example shown in the accompanying drawings.

DESCRIPTION OF THE PREFERRED EMBODIMENTS

Figure 1:
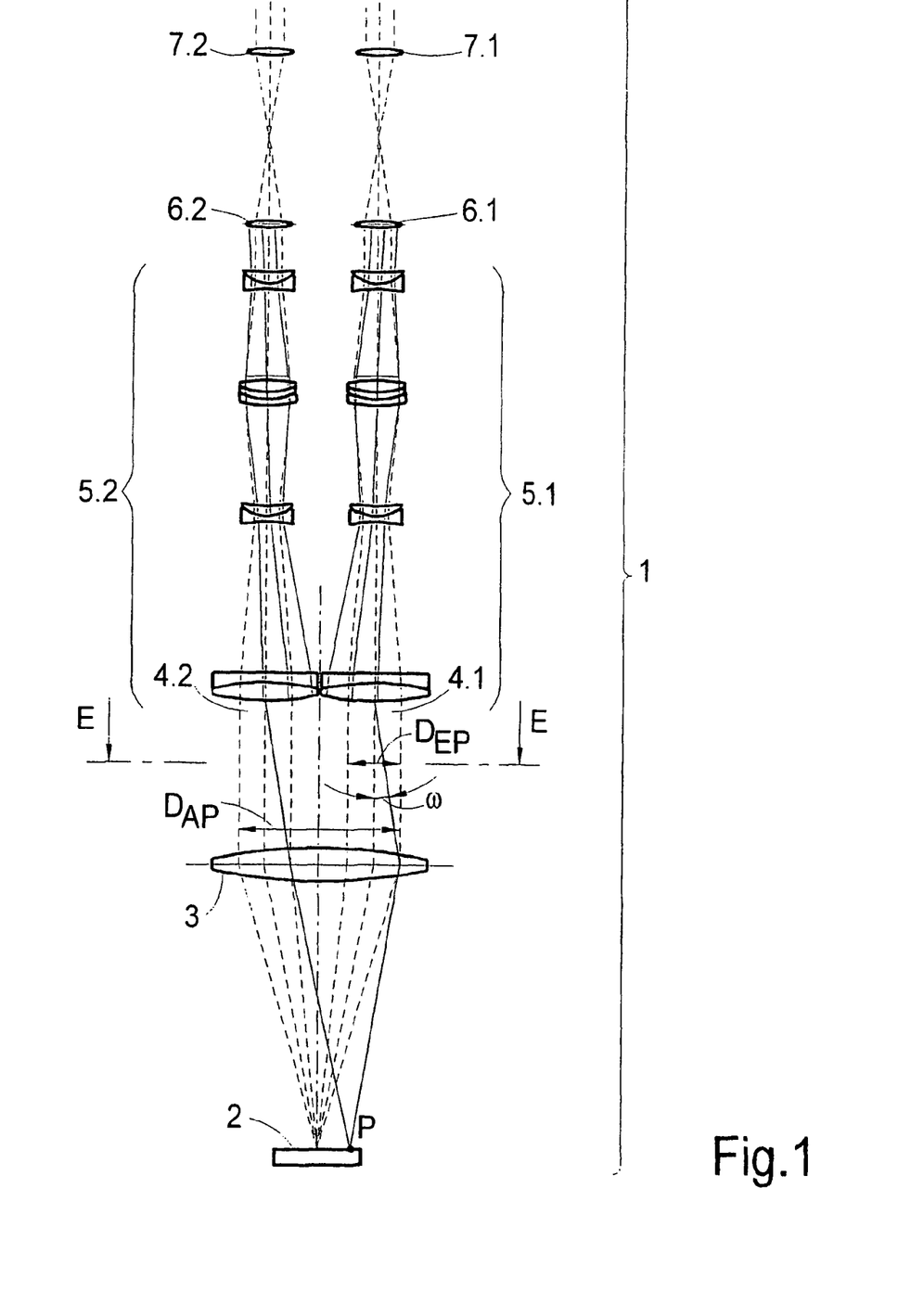
FIG. 1 shows the basic construction of a common state-of-the-art telescope-type stereomicroscope.

FIG. 1 shows the basic construction of a common state-of-the-art telescope-type stereomicroscope 1. The stereomicroscope 1 is used for stereoscopic observation of an object 2 and substantially comprises an objective 3 which collects the light coming from the object 2. On the side remote of the object 2, the light passes two magnification changers 5.1, 5.2 in two imaging beam paths 4.1, 4.2 which are oriented parallel to one another. The light coming from an extra-axial object point P, for example, enters the associated magnification changer 5.1, 5.2 at an angle ω.

The magnification changers 5.1, 5.2 make it possible for the user to adjust different magnifications while observing the object 2. The angle co depends on the magnification determined by the magnification changer 5.1, 5.2 and varies as the magnification setting changes. The angle c reaches its maximum when the lowest magnification is selected. In the present embodiment example, the angle ω meets the condition $\tan(\omega) \leq 0.16$ at the minimum magnification setting.

A tube lens system 6.1, 6.2 and an eyepiece 7.1, 7.2 are arranged downstream of the magnification changers 5.1, 5.2 in the imaging beam paths 4.1, 4.2.

The entrance pupils of the magnification changers 5.1, 5.2 lying in plane E-E each have a diameter $D_{EP}$ which likewise depends on the magnification adjusted at the magnification changers 5.1, 5.2. The diameter $D_{EP}$ reaches its maximum at the maximum magnification setting.

Figure 2:
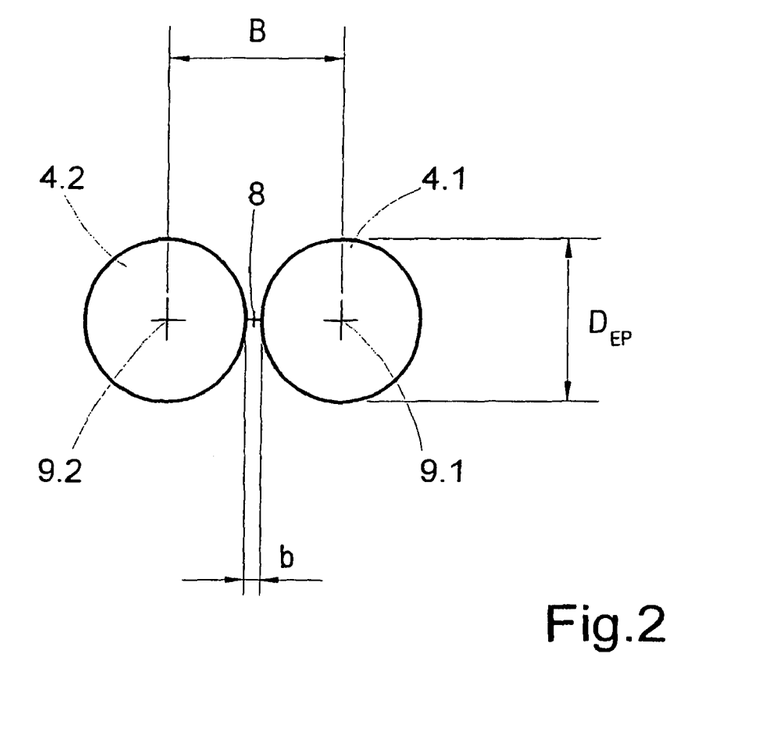
FIG. 2 is a schematic view of a cross section in plane E-E through the beam path of the microscope according to FIG. 1.

FIG. 2 is a schematic view of a cross section in the plane E-E through the beam path of the microscope according to FIG. 1. The principal axis 8 of the objective 3 and the imaging beam paths 4.1, 4.2 symmetric to the principal axis 8 with their optical axes 9.1 and 9.2 are shown.

As can also be seen in FIG. 2, the optical axes 9.1 and 9.2 of the two imaging beam paths 4.1, 4.2 are arranged at a distance B from one another. The diameter $D_{EP}$ of the entrance pupils are shown here at the maximum magnification setting and have accordingly reached their maximum amount. When the selected magnification is lower, the diameters $D_{EP}$ of the entrance pupils are also smaller.

FIG. 2 further shows that the entrance pupils at maximum diameter $D_{EP}$ have a distance b from one another. This configuration results from the fact that the condition $D_{EP} \leq B/1.07$ is always met in stereomicroscopes according to the prior art.

According to the invention, in contrast to the prior art, the condition $D_{EP} > B/1.07$ is met with respect to the distance B and the diameter $D_{EP}$ of the entrance pupils at the maximum magnification setting. Specifically, $D_{EP} = 1.55*B$ in the present embodiment example.

Figure 3:
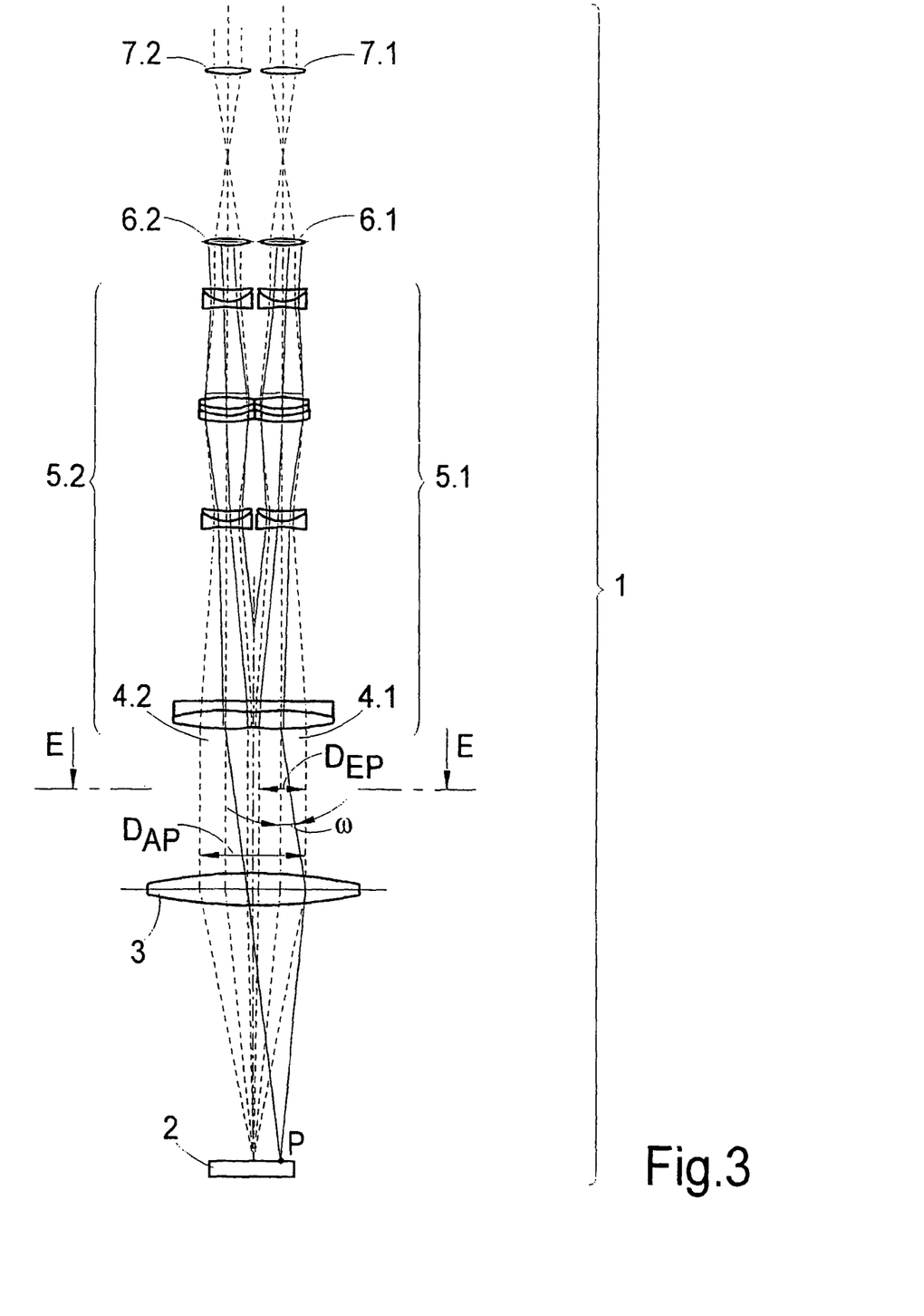
FIG. 3 shows the basic construction of a stereomicroscope according to the present invention.

Accordingly, the stereomicroscope 1 is constructed as shown in FIG. 3. The same reference numbers used in FIG. 1 are retained to illustrate the view in FIG. 3.

FIG. 3 shows that the distance B between the optical axes of the imaging beam paths 4.1, 4.2 is smaller compared to FIG. 1.

Figure 4:
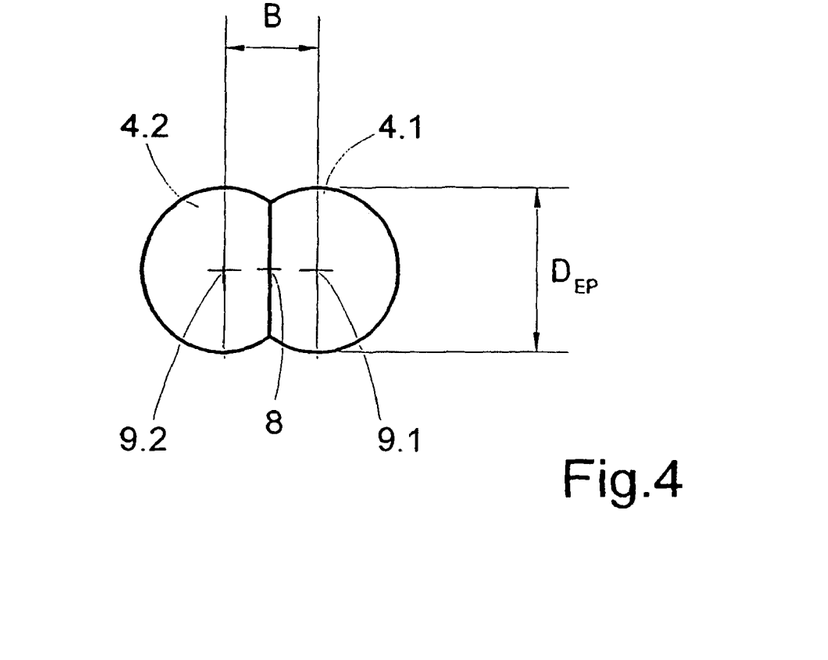
FIG. 4 is a schematic view of a cross section in plane E-E through the beam path of the microscope according to FIG. 3.

The selected equation, $D_{EP} = 1.55*B$, will be illustrated with reference to FIG. 4. FIG. 4 shows that the distance B between the optical axes 9.1, 9.2 of the imaging beam paths 4.1, 4.2 is smaller than a diameter $D_{EP}$ so that each of the pupils in the two imaging beam paths 4.1, 4.2 has the shape of a circular segment. The diameter $D_{EP}$ of the entrance pupils in this case is 23 mm, respectively, and the distance B is 14.8 mm which corresponds to the equation $D_{EP}=1.55*B$.

It should be emphasized again that this refers to the highest possible magnification that can be adjusted. When the magnification is lower, the circle segments are larger because the diameters $D_{EP}$ of the entrance pupils change. They become circular again as the magnification is further reduced.

This construction according to the invention requires trimming at the circumference of the optical components in the magnification changers. The resulting light loss is approximately 50%, which is acceptable.

Over against this disadvantage, there are substantial advantages which consist in that the diameter of the exit pupil of the objective can be reduced compared to the prior art while retaining the same resolution, thereby lowering costs, or the resolution can be increased at a constant distance B with an increase in the exit pupil of the objective without compromising the modularity of the tubes and intermediate tubes which are based on the distance B.

It is further provided in the stereomicroscope according to the invention that the angle $\omega$ meets the condition $\tan(\omega) \geq 0.16$ at the minimum magnification setting.

Figure 5:
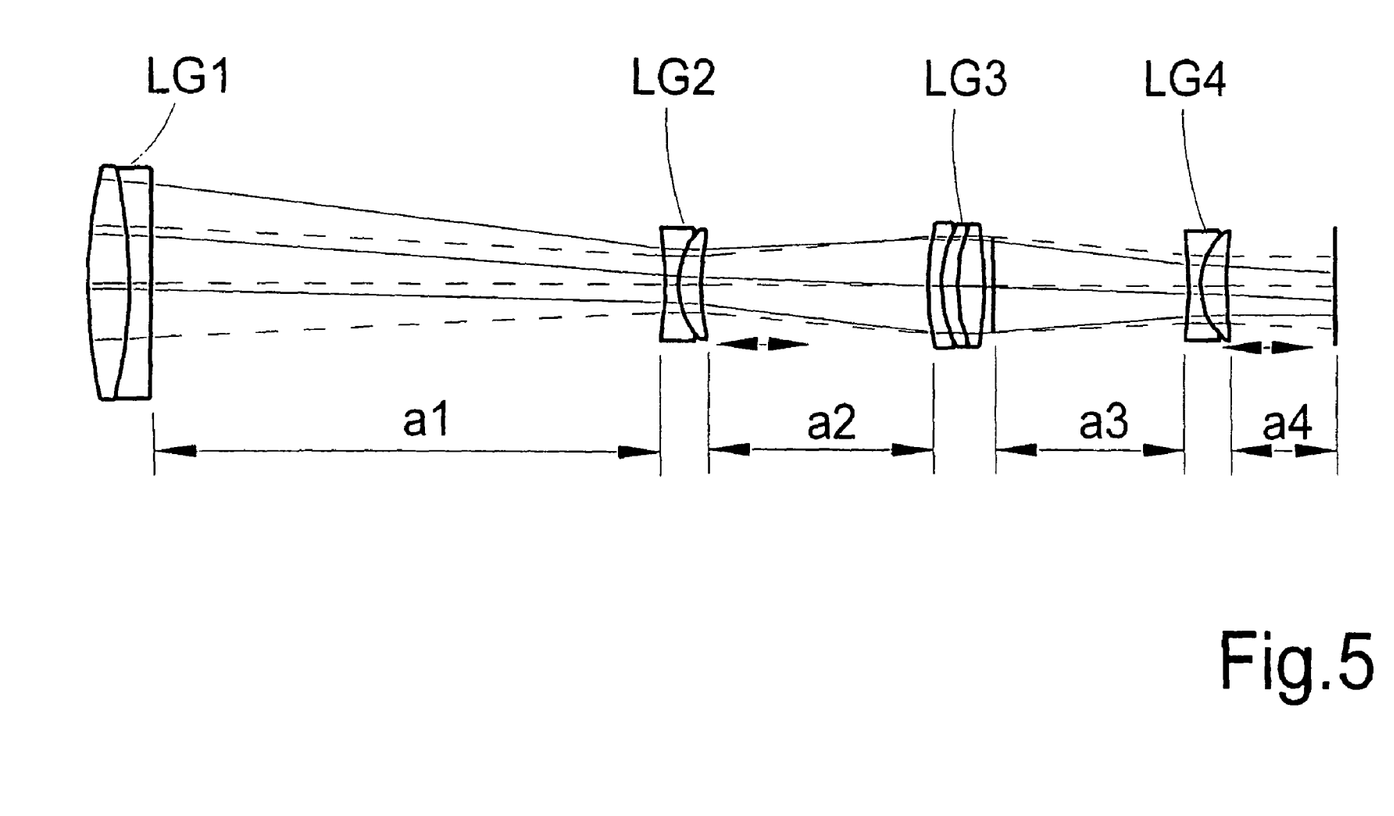
FIG. 5 shows an example of a magnification changer that is suitable for use in the stereomicroscope according to the invention.

FIG. 5 shows a magnification changer which is suitable in a particularly advantageous manner for the construction of a stereomicroscope according to the invention.

This magnification changer, which has a structural length of 130 mm, comprises four optical assemblies designated by LG1 to LG4 starting from the object side. Assemblies LG2 and LG4 are movable in relation to the other two assemblies LG1 and LG3 in direction of the optical axis. To this end, they can be coupled with drives, for example, stepper motors.

These magnification changers have the following constructional data:

| Plane or lens group | Radii r | Thicknesses d | Variable distances | Refractive Index $n_e$ | Abbe Number $v_e$ | $\varnothing_{EP}$ |
|---|---|---|---|---|---|---|
| Infinity space to the objective | | | | | | |
| LG1 | 55.83000 | 4.50000 | | 1.530190 | 76.58 | 23 |
| | −55.83000 | 2.30000 | | 1.584820 | 40.57 | |
| | infinity | | | | | |
| | | | a1 | | | |
| LG2 | −35.22750 | 1.40000 | | 1.747910 | 44.57 | 10.2 |
| | 9.17300 | 2.50000 | | 1.812659 | 25.16 | |
| | 25.12050 | | | | | |
| | | | a2 | | | |
| LG3 | 30.06750 | 1.50000 | | 1.812659 | 25.16 | 11.6 |
| | 15.07000 | 1.80000 | | 1.489140 | 70.23 | |
| | 18.96900 | 2.90000 | | 1.716160 | 53.61 | |
| | −44.98960 | | | | | |
| Diaphragm | | 1.00000 | | | | |
| | infinity | | | | | 10.6 |
| | | | a3 | | | |
| LG4 | −47.65660 | 1.30000 | | 1.620680 | 49.54 | 9.8 |
| | 7.94400 | 2.90000 | | 1.624080 | 36.11 | |
| | 41.86920 | | | | | |
| | | | a4 | | | |
| Infinity space to the tube lens | | | | | | |

In this magnification changer, the initial value of the magnification is 0.32 and the end value is 4.0. The magnification range is accordingly 12.5×. $\tan(\omega)=0.18$ is reached for magnification at 0.32. Therefore, the condition $\tan(\omega) \geq 0.16$ is met. Selected magnifications are given at the following distance settings:

| | Magnification | | |
|---|---|---|---|
| | 4.0x | 1.0x | 0.32x |
| a1 | 68.657 | 39.472 | 2.098 |
| a2 | 11.189 | 40.373 | 77.747 |
| a3 | 28.039 | 12.818 | 3.104 |
| a4 | 0.016 | 15.237 | 24.951 |

Figure 6:
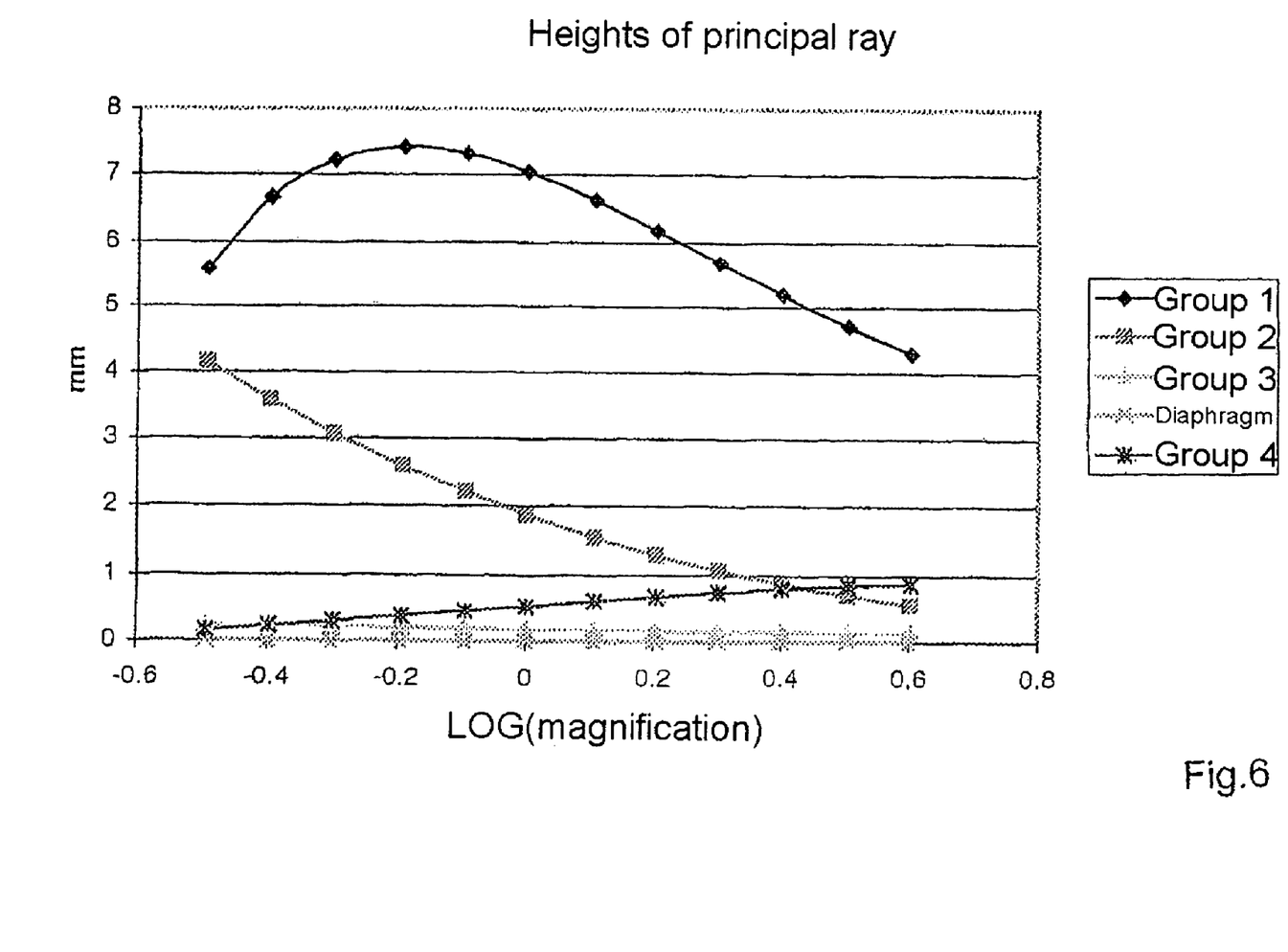
FIG. 6 shows a graph for determining the maximum height of the principal ray in a magnification changer according to FIG. 5.

The maximum height of the principal ray, which is 7.4 mm in the selected embodiment example, can be determined from the graph in FIG. 6. The design of the stereomicroscope according to the invention is based on this principal ray height. This gives the above-stated distance B=14.8 mm with a diameter $D_{EP}=23$ mm of the entrance pupil. In FIG. 6, LOG(magnification) designates the mathematical function of the logarithm.

While the foregoing description and drawings represent the present invention, it will be obvious to those skilled in the art that various changes may be made therein without departing from the true spirit and scope of the present invention.

REFERENCE NUMBERS 1 stereomicroscope
2 object
3 objective
4.1, 4.2 imaging beam paths
5.1, 5.2 magnification changers
6.1, 6.2 tube lens systems
7.1, 7.2 eyepieces
8 principal optical axis of the objective
9.1, 9.2 optical axes of the imaging beam paths
B distance between the optical axes
b distance between the entrance pupils
$D_{AP}$ diameter of the exit pupils
$D_{EP}$ diameter of the entrance pupils
$\omega$ angle

The invention claimed is:

1. A telescope-type stereomicroscope comprising:
   an objective;
   two magnification changers which are arranged downstream of the objective for selecting different magnifications while observing an object;
   light coming from an object entering the objective;
   two light bundles of the light re-exiting from the objective which are oriented parallel to one another entering said magnification changers;
   optical axes of the magnification changers being arranged at a fixed distance B from one another;

each magnification changer having an entrance pupil for the light bundle associated with it, which entrance pupil has a diameter $D_{EP}$ that depends on the respective selected magnification; and condition $D_{EP} > B/1.06$ being met at the maximum selected magnification.

2. The stereomicroscope according to claim 1, wherein the condition $B/1.06 < D_{EP} \leq B/1.04$ is met, and the two magnification changers are constructed in such away that their physical extension perpendicular to the optical axes in direction of the respective neighboring magnification changer is $\leq B/2$.

3. The stereomicroscope according to claim 1; wherein the condition $D_{EP} \leq 1.55 \bigstar B$ is met.

4. The stereomicroscope according to claim 3; wherein the diameter $D_{EP} = 23$ mm and the distance $B \geq 14.8$ mm.

5. The stereomicroscope according to claim 1; wherein the angle $\omega$ at which the light coming from an extra-axial point P at the object enters the magnification changers and which depends on the selected magnification meets the condition $\tan(\omega) \geq 0.16$ at the lowest possible magnification setting.

6. The stereomicroscope according to claim 1; wherein said magnification changers comprise at least four optical assemblies, two of which being displaceable relative to one another and relative to the rest of the assemblies when changing magnification.

7. The stereomicroscope according to claim 6; wherein every selectable magnification can be achieved by an identically directed displacing movement of the two movable assemblies, wherein the relative distance between the two assemblies changes during the displacing movement.

8. The stereomicroscope according to claim 7; wherein said magnification changers having the following constructional data:

| Plane or lens group | Radii r | Thicknesses d | Variable distances | Refractive Index $n_e$ | Abbe Number $v_e$ | $\varnothing_{EP}$ |
|---|---|---|---|---|---|---|
| Infinity space to | | | | | | |

| Plane or lens group | Radii r | Thicknesses d | Variable distances | Refractive Index $n_e$ | Abbe Number $v_e$ | $\varnothing_{EP}$ |
|---|---|---|---|---|---|---|
| the objective | | | | | | |
| LG1 | 55.83000 | 4.50000 | | 1.530190 | 76.58 | 23 |
|  | −55.83000 | 2.30000 | | 1.584820 | 40.57 | |
|  | infinity | | | | | |
|  | | | a1 | | | |
| LG2 | −35.22750 | 1.40000 | | 1.747910 | 44.57 | 10.2 |
|  | 9.17300 | 2.50000 | | 1.812659 | 25.16 | |
|  | 25.12050 | | | | | |
|  | | | a2 | | | |
| LG3 | 30.06750 | 1.50000 | | 1.812659 | 25.16 | 11.6 |
|  | 15.07000 | 1.80000 | | 1.489140 | 70.23 | |
|  | 18.96900 | 2.90000 | | 1.716160 | 53.61 | |
|  | −44.98960 | | | | | |
| Diaphragm | | 1.00000 | | | | |
|  | infinity | | | | | 10.6 |
|  | | | a3 | | | |
| LG4 | −47.65660 | 1.30000 | | 1.620680 | 49.54 | 9.8 |
|  | 7.94400 | 2.90000 | | 1.624080 | 36.11 | |
|  | 41.86920 | | | | | |
|  | | | a4 | | | |
| Infinity space to the tube lens | | | | | | | wherein selected magnifications are associated with the following distance settings:

| | Magnification | | |
|---|---|---|---|
| | 4.0x | 1.0x | 0.32x |
| a1 | 68.657 | 39.472 | 2.098 |
| a2 | 11.189 | 40.373 | 77.747 |
| a3 | 28.039 | 12.818 | 3.104 |
| a4 | 0.016 | 15.237 | 24.951 |

\* \* \* \* \*

UNITED STATES PATENT AND TRADEMARK OFFICE
CERTIFICATE OF CORRECTION

PATENT NO. : 7,724,427 B2  Page 1 of 1
APPLICATION NO. : 11/664557
DATED : May 25, 2010
INVENTOR(S) : Johannes Winterot It is certified that error appears in the above-identified patent and that said Letters Patent is hereby corrected as shown below:

On the Title Pg

Please correct the Item (73) Assignee from "Carl Zeiss Microimaging GmbH" to --Carl Zeiss MicroImaging GmbH--

Signed and Sealed this

Twenty-first Day of September, 2010

David J. Kappos
*Director of the United States Patent and Trademark Office*